(12) United States Patent
Varlet et al.

(10) Patent No.: US 7,507,474 B2
(45) Date of Patent: *Mar. 24, 2009

(54) THERMOPLASTIC POLYMER COMPOSITION COMPRISING A HYPERBRANCHED POLYMER AND ARTICLES MADE USING SAID COMPOSITION

(75) Inventors: Joël Varlet, Dardilly (FR); Florence Clement, Lyons (FR); Franck Touraud, Vernon (FR); Sandrine Rochat, Villeurbanne (FR); Natalia Scherbakoff, Vourles (FR)

(73) Assignee: Rhodianyl, Boulogne Billancourt Cedex (FR)

( * ) Notice: Subject to any disclaimer, the term of this patent is extended or adjusted under 35 U.S.C. 154(b) by 241 days.

This patent is subject to a terminal disclaimer.

(21) Appl. No.: 10/498,255

(22) PCT Filed: Dec. 16, 2002

(86) PCT No.: PCT/FR02/04367

§ 371 (c)(1),
(2), (4) Date: Oct. 12, 2004

(87) PCT Pub. No.: WO03/051998

PCT Pub. Date: Jun. 26, 2003

(65) Prior Publication Data

US 2006/0211822 A1 Sep. 21, 2006

(51) Int. Cl.
*C08G 69/02* (2006.01)
*C08G 69/08* (2006.01)
*C08G 63/00* (2006.01)
*C08G 73/10* (2006.01)
*C08G 69/26* (2006.01)

(52) U.S. Cl. .............. 428/364; 428/357; 524/451; 524/513; 524/514; 524/537; 524/538; 524/539; 524/540; 525/54.2; 525/54.21; 525/54.24; 525/54.3; 525/54.31; 525/54.42; 525/54.45; 525/58; 525/60; 525/63; 525/165; 525/166; 525/167; 525/170; 525/178; 525/179; 525/183; 525/184; 525/390; 525/393; 525/397; 525/425; 525/431; 525/432; 525/434; 525/436; 525/437; 525/439; 525/444; 525/446; 525/474; 525/477; 424/DIG. 16

(58) Field of Classification Search ........... 525/58, 525/60, 63, 165, 166, 167, 170, 178, 179, 525/183, 184, 390, 393, 397, 425, 431, 432, 525/434, 436, 437, 439, 444, 446, 474, 477, 525/54.2, 54.21, 54.24, 54.3, 54.31, 54.42, 525/54.45; 524/451, 513, 514, 537, 538, 524/539, 540; 428/357, 364
See application file for complete search history.

(56) References Cited

U.S. PATENT DOCUMENTS 6,225,404 B1 * 5/2001 Sorensen et al. ........... 525/54.1
6,872,800 B1 * 3/2005 Bouquerel et al. .......... 528/310

* cited by examiner

*Primary Examiner*—Ana L Woodward
(74) *Attorney, Agent, or Firm*—Buchanan, Ingersoll & Rooney P.C.

(57) ABSTRACT

The invention relates to thermoplastic compositions comprising a polymer matrix and an additive which modifies the rheological behavior of the matrix in the molten state. The purpose of the invention is to provide a preferably non-reactive additive which can be dispersed in the matrix and which can be used to obtain a good compromise in terms of rheological properties/mechanical properties. According to the invention, the additive is a hyperbranched polymer which is functionalized by R<2> radicals, R<2> being a radical of the following type: substituted or non-substituted hydrocarbon, of the silicon type, linear or branched alkyl, aromatic, arylalkyl, alkylaryl or cycloaliphatic, which can comprise one or more unsaturations and/or one or more heteroatoms. Preferably, the composition does not contain hyperbranched polymers which produce therein a reduction in the molar mass of matrix M which is greater than or equal to 7% in relation to a sample composition which comprises matrix M but which does not contain hyperbranched polymer additive(s). Said mass measurement is taken preferably using a predetermined protocol P. The invention is suitable for molding, extrusion, engineered plastics, wires and fibers.

24 Claims, 2 Drawing Sheets

THERMOPLASTIC POLYMER COMPOSITION COMPRISING A HYPERBRANCHED POLYMER AND ARTICLES MADE USING SAID COMPOSITION

This application is an application under 35 U.S.C. Section 371 of International Application Number PCT/FR02/04367 filed on Dec. 16, 2002.

The field of the invention is that of thermoplastic polymer compositions comprising a thermoplastic polymer matrix and at least one additive for modifying the rheological behaviour.

For purposes of the present specification, the term "polymer" denotes either a homopolymer or a copolymer.

Thermoplastic polymers are raw materials that may be converted by moulding, injection-moulding, injection blow-moulding, extrusion, extrusion blow-moulding or spinning, especially into numerous articles such as expanded, extruded or moulded parts (for example for bodywork), yarns, fibres or films.

There are at least two major constraints in all these approaches for converting thermoplastic polymer.

The first of these constraints is that the thermoplastic polymers used might be characterized, in the melt, by a viscosity or rheological behaviour that is compatible with the above-mentioned forming processes. These thermoplastic polymers must be fluid enough when in the melt to be able to be conveyed and handled easily and quickly in certain forming machines.

The other constraint that falls on thermoplastic polymer compositions is associated with the mechanical qualities they must have after having been melted, formed and cured by cooling. These mechanical qualities are especially the impact strength, the flexural modulus and the flexural breaking strength, inter alia.

Moreover, it is common practice, in order to improve the mechanical properties of thermoplastic polymers, to incorporate reinforcing fillers (fibres or yarns) therein, for example mineral, glass or carbon fillers, to form composite materials.

One of the technical problems posed with regard to these two constraints: rheological behaviour in the melt and mechanical properties of the formed product in solidified form, is that they are, in principle, antinomic.

Specifically, to reduce the melt viscosity, it is well known to select thermoplastic polymers that have low molar masses. However, this gain in terms of rheology is achieved at the expense of the mechanical qualities of the formed and cured polymer.

In an attempt to correct this, it is also common practice to incorporate into thermoplastic polymer matrices various additives capable of modifying their rheological behaviour in the melt. These additives are all the more useful when the polymers comprise reinforcing fillers.

The dilemma with which one is confronted with these additives is that they must be both inert or non-reactive with the matrix, so as not to induce profound changes in the chemical structure (for example crosslinking), while at the same time being dispersible in this matrix so as to give it the required functionalities, in a homogeneous manner.

Now, the first requirement of non-reactivity would rather tend towards additive molecules that are incompatible with those of the matrix, whereas the second requirement of dispersibility rather directs the person skilled in the art towards additives whose structure is compatible with that of the matrix.

Moreover, additives that modify the rheology must be capable of improving the ability of the thermoplastic polymer to be moulded, injected or extruded.

As regards the polyamides that are more particularly of interest in the context of the present invention, it has been proposed to use hyperbranched polymers, and especially hyperbranched copolyamides, as additives for modifying the rheology in thermoplastic polyamide matrices.

French patent application no. 2 793 252 describes hyperbranched copolyamides (HBPAs), for example of the type containing carboxylic acid end groups, obtained by melt-copolycondensation of 1,3,5-benzenetricarboxylic acid (BTC): core molecule of $R^1$-$B''_3$ type, with $B''$=COOH, of 5-aminoisophthalic acid (AIPA): branching molecule of A-R-$B_2$ type, with A=$NH_2$ and B=COOH and of ε-caprolactam (CL): spacer of A'-R'-B' type with A'=$NH_2$ and B'=COOH—).

Hyperbranched polymers generally range from a few nanometers to several tens of nanometers in size.

These hyperbranched polymers may be functionalized especially with fatty chains or hydrophobic and/or hydrophilic chains, for the purposes of being used, for example, as agents for modifying the surface properties of linear or branched polymers, preferably polyamides. These functionalities may be provided on the hyperbranched polymer by incorporating in the melt-copolycondensation a chain-terminating monomer of R'''-A type.

In this state of the art, one of the essential objects of the present invention is to propose an additive for modifying the rheological behaviour of thermoplastic polymers, which is:

capable of allowing the controlled modification of the rheological properties of the thermoplastic composition, in particular the melt viscosity (fluidization), and of doing so without affecting the mechanical properties of the formed and cured thermoplastic polymer (impact strength), preferably not reactive with respect to the thermoplastic matrix, advantageously made of polyamide, i.e. not capable of resulting in changes to the chemical structure of the thermoplastic matrix, reflected, for example, by reductions in the molar mass of the matrix, preferably readily dispersible in this matrix.

Another object of the invention is to provide a thermoplastic polymer composition comprising a thermoplastic matrix and at least one additive chosen from modifiers of the rheological behaviour in the melt, such that the composition has a melt fluid index that is suitable for moulding and injection-moulding operations (total filling of the mould), without affecting the mechanical properties, and in particular the impact strength.

Another object of the present invention is to provide a thermoplastic polymer composition that is adapted to the various melt-forming techniques: injection-moulding, injection blow-moulding, extrusion blow-moulding, film formation, extrusion and spinning, and moreover having high mechanical strength and optionally good transparency (low crystallinity).

Another object of the invention is to provide a thermoplastic polymer composition that has the rheological (in the melt) and mechanical qualities that are required in the plastics conversion industry, without the supplementation performed to improve these properties being too expensive and disrupting the other properties of the thermoplastics.

Another object of the invention is to provide a hyperbranched polymer additive for modifying rheological behaviour which is capable of modifying the melt rheological behaviour of thermoplastic polymer compositions in a controlled and optimized manner.

Another essential object of the invention is to provide articles obtained by conversion (mouldings, injection-moulding, injection blow-moulding, extrusion blow-moulding, extrusion or spinning) of the composition as defined in the above objects.

These objects, inter alia, are achieved by the present invention, which derive from the astute and advantageous selection that the inventors, to their credit, have made, by selecting specific hyperbranched polymers as additives for modifying the melt rheological behaviour.

Consequently, the present invention relates firstly to a thermoplastic polymer composition, characterized in that it comprises:

a matrix M based on at least one thermoplastic polymer, and at least one hyperbranched polymer additive for modifying the rheological behaviour, comprising at least one polymer or copolymer:
which is functionalized,
which is hyperbranched,
at least 50% of the end groups of this hyperbranched polymer are functionalized with $R^2$, wherein $R^2$ is a substituted or unsubstituted linear or branched alkyl, an aromatic group, aralkyl, alkaryl or a cycloaliphatic group, each optionally having one or more unsaturations or one or more hetero atoms, or $R^2$ is a substituted or unsubstituted silicone containing group.

The expression "hyperbranched polymer" means a branched polymer structure obtained by polymerization in the presence of compounds having a functionality of greater than 2, and the structure of which is not fully controlled. They are often random copolymers. Hyperbranched polymers may be obtained, for example, by reaction especially between multifunctional monomers, for example, trifunctional and bifunctional monomers, each of the monomers bearing at least two different polymerization-reactive functions.

Advantageously, the hyperbranched polymer of the invention is chosen from hyperbranched polyesters, polyesteramides and polyamides.

The hyperbranched polymer additive of the invention is preferably a hyperbranched polyamide comprising at least one hyperbranched copolyamide of the type obtained by reaction between:

at least one monomer of formula (I) below:

in which A is a polymerization-reactive function of a first type, B is a polymerization-reactive function of a second type that is capable of reacting with A, R is a hydrocarbon-based species optionally comprising hetero atoms, and f is the total number of reactive functions B per monomer: $f \geq 2$, preferably $2 \leq f \leq 10$;

optionally at least one difunctional spacer monomer of formula (II) below:

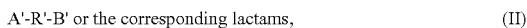

in which A', B' and R' have the same meaning as that given above for A, B and R, respectively in formula (I);

optionally at least one "core" monomer of formula (III):

in which:
$R^1$ is a substituted or unsubstituted linear or branched alkyl, an aromatic group, aralkyl, alkaryl or a cycloaliphatic group, each which may comprise unsaturations and/or hetero atoms, or $R^2$ is a substituted or unsubstituted silicone containing group;
B'' is a reactive function of the same nature as B or B';
$n \geq 1$, preferably $1 \leq n \leq 100$; and
at least one "chain-limiting" functionalization monomer corresponding to formula (IV):

in which:
A'' is a reactive function of the same nature as A or A' and $R^2$ has the same meaning as that previously described above.

Preferably, the composition according to the invention is free of hyperbranched polymer additives that result in a reduction of the molar mass of the matrix M of greater than or equal to 7% relative to a control composition comprising the same matrix M not supplemented with hyperbranched polymer, the molar mass measurement being performed according to a given protocol P. The details of protocol P for measuring the molar mass are given in the examples below.

In accordance with the invention, the functionalized hyperbranched polymer additive thus advantageously has the characteristic of being able to modify the rheological behaviour of a thermoplastic polymer matrix, without affecting its structural integrity, and in particular without consequently decreasing its molar mass. This means that the additive does not appear to react with the matrix.

According to the present invention, the molar mass is defined as the maximum of the distribution of the molar masses of the polymer matrix supplemented with functionalized hyperbranched polymer, in polystyrene equivalents, by Gel Permeation Chromatography (GPC), with detection by refractometry, as is defined in protocol P given in detail below.

The molar mass measurement is performed on the composition to be analysed and on the control composition, which are extruded, solidified and then optionally formed into granules.

The abovementioned protocol P for measuring the molar mass of the matrix M in a composition to be analysed and in a control composition involves an extrusion, which leads to the production of rods. The rods are subsequently formed into granules and then subjected to the actual molar mass determination. This protocol P for measuring the molar mass of the compositions according to the invention and of the control compositions is as follows:

1. Matrix M/Functionalized Hyperbranched Polymer Compositions

The matrix M, especially polyamide and the functionalized hyperbranched polymer are in ground or crushed form as powder, flakes or granules, and are then preblended. The blend is introduced into a twin-screw extruder. This mixture is melted in the extruder at a temperature Q which is about 30° C. higher than the melting point $Q_{melting}$ of the matrix M. Homogenization of M/hyperbranched polymer is thus performed for 5 minutes and rods are collected at the extruder outlet, and are then formed into granules.

The actual molar mass measurement is performed on the granules by gel permeation chromatography (GPC) in dicholoromethane after derivatization of the polyamide with trifluoroacetic anhydride, relative to polystyrene standards. The detection technique used is refractometry.

2/Control Compositions of Matrix M Without Hyperbranched Polymer Additive

For each given M/hyperbranched polymer composition, a molar mass measurement of the same matrix M is performed on a composition comprising the matrix M without hyperbranched polymer additive.

The method is performed on granules of polymer M, especially of polyamide obtained in the same way as that indicated in point 1 above, the only difference being that the granules do not contain any hyperbranched polymer additive.

As regards the composition M+functionalized hyperbranched polymer of the invention, it may be noted that extrusion constitutes one means, among others, for melt-blending the constituents M and functionalized hyperbranched polymer.

The radical $R^2$ for functionalization of the hyperbranched polymer is preferably not reactive with the matrix and, entirely surprisingly and unexpectedly, induces a quite significant fluidization of the composition in the melt. Specifically, the gains obtained in this respect are particularly large since they may be, for example, at least 10 to 50%, without this adversely affecting the mechanical properties, and in particular the impact strength of the thermoplastic.

The flow index/impact strength compromise achieved is entirely advantageous.

The functionalized hyperbranched polymer additive used in accordance with the invention is easy to use and economical.

According to one preferred arrangement of the invention, the functionalized hyperbranched polyamide additive of the composition is characterized in that:
the hydrocarbon-based species R and R' of the monomers (I) and (II), respectively, each comprise:
  i. at least one linear or branched aliphatic radical;
  ii. and/or at least one cycloaliphatic radical;
  iii. and/or at least one aromatic radical comprising one or more aromatic nuclei;
  iv. and/or at least one araliphatic radical; these radicals (i), (ii), (iii) and (iv) possibly being substituted and/or comprising hetero atoms;
A or A' is a reactive function of amine or amine salt or of acid, ester, acid halide or amide;
B or B' is a reactive function of acid, ester, acid halide or amide or of amine or amine salt.

Thus, the polymerization-reactive functions A, B, A' and B' that are more especially selected are those belonging to the group comprising carboxylic and amine functions.

For purposes of the invention, the term "carboxylic function" means any acid function COOH or derivative of the ester, acid halide (chloride), or anhydride.

Advantageously, the hyperbranched polyamide for modifying the rheological behaviour in the composition may consist of a mixture of several different monomers (I), several different monomers (II), several different "core" monomers (III), and/or several different functionalization monomers (IV).

The difunctional monomers (II) are spacer elements in the three-dimensional structure.

According to one advantageous embodiment of the invention, the spacer monomers (II), the chain-limiting monomers (IV) and/or the monomers (III) of "core" type may be in the form of oligomers.

Preferably, f=2, such that the monomer (I) is trifunctional: $A-R-B_2$, A=amine function, B=carboxylic function and R=aromatic radical.

Moreover, it is preferable for the functionalized hyperbranched polyamide additive to be characterized by a molar ratio III/I+II+IV defined as follows:
III/I+II+IV≦1/150
and preferably III/I+II+IV≦1/100
and even more preferably III/I+II+IV≦1/50.

According to one particular feature of the invention, the functionalized hyperbranched polyamide additive used is, for example:
either "small" (of low mass), i.e. characterized by a ratio:
1/10≦III/I+II+IV≦1/40,
or "large" (of high mass), i.e. characterized by a ratio:
1/50≦III/I+II+IV≦1/90.

According to one advantageous variant, the radical $R^2$ for functionalization of the hyperbranched polymer is chosen from linear alkyls containing from 8 to 30 carbon atoms and preferably from 10 to 20 carbon atoms, or polycondensed or non-polycondensed aryls, aralkyls or alkaryls.

In practice, and without it being limiting for the functionalized hyperbranched polyamide:
the monomer (I) is chosen, for example, from the group comprising:
  5-amino-isophthalic acid,
  6-amino-undecanedioic acid,
  3-aminopimelic diacid,
  aspartic acid,
  3,5-diaminobenzoic acid,
  3,4-diaminobenzoic acid,
  and mixtures thereof;
the difunctional monomer of formula (II) is chosen, for example, from the group comprising:
  ε-caprolactam and/or the corresponding amino acid aminocaproic acid,
  para- or meta-aminobenzoic acid,
  11-amino-undecanoic acid,
  lauryllactam and/or the corresponding amino acid, 2-aminododecanoic acid,
  and mixtures thereof;
the "core" monomer (III) is chosen, for example, from the group comprising:
  1,3,5-benzenetricarboxylic acid,
  2,2,6,6-tetra(β-carboxyethyl)cyclohexanone,
  2,4,6-(triaminocaproic acid)-1,3,5-triazine,
  4-aminoethyl-1,8-octanediamine,
  and mixtures thereof;
the "chain-limiting" functionalization monomer (IV) is chosen, for example, from the group comprising:
  n-hexadecylamine,
  n-octadecylamine,
  n-dodecylamine,
  benzylamine,
  and mixtures thereof.

For further details regarding this hyperbranched polyamide, reference will be made to French patent application No 2 793 252, both as regards the structural aspects and as regards the methods for obtaining this functionalized hyperbranched polyamide.

As regards the monomers (I), (II) and optionally (III), mention will be made, respectively, of 5-aminoisophthalic acid (AIPA, branching molecule of $A-R'-B_2$ type, with $A=NH_2$), caprolactam (written CL, spacer of A-R"-B type) and 1,3,5-benzenetricarboxylic acid (BTC, core molecule of R-B3 type, with B=COOH).

In quantitative terms, it is preferable within the context of the invention for the additive comprising the hyperbranched copolymer to be present in a proportion (as a % of the dry weight relative to the total mass of the composition) of:
0.1 to 50
preferably 1 to 20
and even more preferably 2 to 10.

Furthermore, it has been found to be particularly advantageous for the hyperbranched polyamide functionalized and used as additive for modifying the rheological behaviour in the composition according to the invention to be a hyperbranched polyamide whose content of acid or amine end groups (EG) (expressed in meq/kg) is between 0 and 100, preferably between 0 and 50 and even more preferably between 0 and 25.

According to one particular embodiment of the invention, the functionalization radicals $R^2$ of the hyperbranched polymer are of the same type throughout the hyperbranched polymer. For example, the hyperbranched polymer may comprise radicals $R^2$ solely of alkyl type, rather than a mixture of several types of radicals $R^2$.

The manufacture of a functionalized hyperbranched copolyamide of the type targeted above, namely:

consisting of one or more functionalized arborescent structures, via monomers (IV) bearing the functionality or functionalities under consideration, and of the type such as the copolyamides obtained by reaction between:

at least one monomer of formula (I) below:

A-R-B$_f$           (I)

in which A is a polymerization-reactive function of a first type, B is a polymerization-reactive function of a second type capable of reacting with A, R is a hydrocarbon-based species optionally comprising hetero atoms, and f is the total number of reactive functions B per monomer: $f \geq 2$, preferably $2 \leq f \leq 10$;

optionally at least one difunctional monomer of formula (II) below:

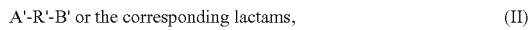

A'-R'-B' or the corresponding lactams,    (II)

in which A', B' and R' have the same meaning as those given above for A, B, and R, respectively in formula (I);

optionally at least one "core" monomer of formula (III);

R$^1$(B")$_n$           (III)

in which:

$R^1$ is a substituted or unsubstituted linear or branched alkyl, an aromatic group, aralkyl, alkaryl or a cycloaliphatic group, each which may comprise unsaturations and/or hetero atoms, or $R^2$ is a substituted or unsubstituted silicone containing group;

B" is a reactive function of the same nature as B or B'; and $n \geq 1$, preferably $1 \leq n \leq 100$;

and at least one "chain-limiting" functionalization monomer corresponding to formula (IV):

R$^2$-A"           (IV)

in which:

$R^2$ is a substituted or unsubstituted linear or branched alkyl, an aromatic group, aralkyl, alkaryl or a cycloaliphatic group, each optionally having one or more unsaturations or one or more hetero atoms, or $R^2$ is a substituted or unsubstituted silicone containing group, and A" is a reactive function of the same nature as A or A', is performed by melt-polycondensation between monomers (I), possibly monomers (II) if present, which also react with monomers (IV), and if present with monomers (III).

The polymerization by copolycondensation is carried out, for example, under conditions and according to a procedure that are equivalent to those used for the manufacture of linear polyamides, for example starting with monomers (II).

As regards the constituent that is essential, in quantitative terms, of the composition according to the invention, namely the thermoplastic matrix, the thermoplastic (co)polymer(s) constituting the matrix is (are) chosen from the group comprising:

polyolefins, polyesters, polyalkylene oxides, polyoxyalkylenes, polyhalogenoalkylenes, poly(alkylenephthalates or terephthalates), poly(phenyl or phenylenes), poly(phenylene oxide or sulphide), polyvinyl acetates, polyvinyl alcohols, polyvinyl halides, polyvinylidene halides, polyvinyl nitrites, polyamides, polyimides, polycarbonates, polysiloxanes, acrylic or methacrylic acid polymers, polyacrylates or polymethacrylates, natural polymers, namely cellulose and its derivatives, synthetic polymers such as synthetic elastomers, or thermoplastic copolymers comprising at least one monomer that is identical to any of the monomers included in the abovementioned polymers, and also blends and/or alloys of all these co(polymers).

In specific terms, it may be mentioned that the matrix may consist of at least one of the following polymers or copolymers:

polyacrylamide, polyacrylonitrile, poly(acrylic acid), ethylene-acrylic acid copolymers, ethylene-vinyl alcohol copolymers, methyl methacrylate-styrene copolymers, ethylene-ethyl acrylate copolymers, (meth)acrylate-butadiene-styrene (ABS) copolymers, and polymers of the same family; polyolefines, for instance low density poly(ethylene), poly(propylene), low-density chlorinated poly(ethylene), poly(4-methyl-1-pentene), poly(ethylene), poly(styrene), and polymers of the same family; ionomers: poly(epichlorohydrins); poly (urethanes) such as products of polymerization of diols, for instance glycerol, trimethylolpropane, 1,2,6-hexanetriol, sorbitol, pentaerythritol, polyetherpolyols, polyesterpolyols and compounds of the same family with polyisocyanates, for instance 2,4-tolylene diisocyanate, 2,6-tolylene diisocyanate, 4,4'-diphenylmethane diisocyanate, 1,6-hexamethylene diisocyanate, 4,4'-dicyclohexylmethane diisocyanate and compounds of the same family; and polysulphones such as the products of reaction between a sodium salt of 2,2-bis(4-hydroxyphenyl)propane and 4,4'-dichlorodiphenyl sulphone; furan resins, for instance, poly(furan); cellulose-ester plastics, for instance cellulose acetate, cellulose-acetate-butyrate, cellulose propionate and polymers of the same family; silicones, for instance poly(dimethylsiloxane), poly(dimethylsiloxane co-phenylmethylsiloxane), and polymers of the same family; blends of at least two of the above polymers.

Advantageously, the thermoplastic polymer matrix M is made of polyester, such as polyethylene terephthalate (PET), polypropylene terephthalate (PPT), or polybutylene terephthalate (PBT), and copolymers and blends thereof.

The thermoplastic polymer(s) is (are) even more preferably selected from the group of (co)polyamides comprising: nylon 6, nylon 6,6, nylon 4, nylon 11, nylon 12, polyamides 4-6, 6-10, 6-12, 6-36 and 12-12, and copolymers and blends thereof.

Other preferred polymers of the invention that may be mentioned include semicrystalline or amorphous polyamides, such as aliphatic polyamides, semi-aromatic polyamides and more generally the linear polyamides obtained by polycondensation between a saturated aliphatic or aromatic diacid and a saturated aromatic or aliphatic primary diamine, the polyamides obtained by condensation of a lactam, an amino acid or the linear polyamides obtained by condensation of a blend of these various monomers.

More specifically, these copolyamides may be, for example, polyhexamethyleneadipamide, the polyphthalamides obtained from terephthalic acid and/or isophthalic acid, such as the polyamide sold under the trade name Amodel, and the copolyamides obtained from adipic acid, from hexamethylene diamine and from caprolactam.

In accordance with one preferred embodiment of the invention, the thermoplastic (co)polymer(s) is (are) a polyamide 6,6.

According to one particular embodiment of the invention, the thermoplastic polymer(s) is (are) a polyamide 6, whose relative viscosity, measured at 25° C. at a concentration of 0.01 g/ml in 96% sulphuric acid solution, is greater than 3.5 and preferably greater than 3.8.

According to another advantageous characteristic of the invention, the polymer matrix (M) of the composition consists of a blend and/or alloy of a polyamide with one or more other polymers, preferably polyamides or copolyamides.

A blend and/or alloy of (co)polyamide with at least one polymer of the polypropylene oxide (PPO), polyvinyl chloride (PVC), or polyacrylo-butadiene-styrene (ABS) type, may also be envisaged.

To improve the mechanical properties of the composition according to the invention, it may be advantageous to incorporate therein at least one reinforcing filler and/or bulking filler chosen from the group comprising fibrous fillers such as glass fibres, mineral fillers, such as clays, kaolin, reinforcing nanoparticles or particles made of thermosetting material, and powder fillers such as talc.

The degree of incorporation of reinforcing filler is in accordance with the standards in the field of composite materials. It may be, for example, a filler content of 1% to 90%, preferably of 10% to 60% and more specifically 50%.

The hyperbranched polymer additives may also be combined with other reinforcing additives such as resilience modifiers, for instance optionally grafted elastomers.

Naturally, the composition according to the invention may also contain any other suitable additives or adjuvants, for example bulking fillers ($SiO_2$), flame retardants, UV stabilizers, heat stabilizers, matting agents ($TiO_2$), lubricants, plasticizers, compounds that are useful for catalysing the synthesis of polymer matrix, antioxidants, antistatic agents, pigments, colorants, moulding aids or surfactants. This list is not in any way limiting.

The compositions according to the invention may be used as raw materials in the field of technical plastics, for example for producing articles moulded by injection-moulding or by injection blow-moulding, extruded by standard extrusion or by blow-extrusion, or films.

The compositions according to the invention may also be made in the form of yarns, fibres or filaments by melt spinning.

The functionalized hyperbranched polymer additive of the invention is introduced into the thermoplastic polymer matrix, preferably polyamide. To do this, use may be made of any known methods for introducing particles into a matrix.

A first method might consist in blending the functionalized hyperbranched polymer into the molten matrix, and optionally in subjecting the blend to a high shear, for example in a twin-screw extrusion device, so as to produce a good dispersion. Such a device is generally arranged upstream of the means for forming the plastic melt (moulding, extrusion or spinning). According to one common embodiment, this blend is extruded in the form of rods that are then chopped into granules. The moulded parts are then produced by melting the granules produced above and feeding the composition in the melt into suitable moulding, injection, extrusion or spinning devices.

In the case of manufacturing yarns, fibres and filaments, the composition obtained at the extruder outlet optionally directly feeds a spinning plant.

A second method may be that which consists in blending the hyperbranched polymer with monomers, in the polymerization medium of the thermoplastic matrix or during the polymerization.

According to one variant, a concentrated blend of a resin and of functionalized hyperbranched polymer, prepared, for example, according to one of the methods described previously, may be blended with the matrix melt.

According to another of its aspects, the present invention is directed towards the articles obtained by forming, preferably by moulding, injection-moulding, injection blow-moulding, extrusion, extrusion blow-moulding or spinning, one of the polymer compositions to which hyperbranched polymer has been added and as defined above.

These articles may be yarns, fibres, films or filaments.

They may also be articles moulded using the composition according to the invention comprising a polymer, especially a polyamide, hyperbranched polymer as defined above, and optionally reinforcing fibres (glass).

A subject of the invention is also the use, as an agent for modifying the rheological behaviour of a thermoplastic polymer matrix, of the functionalized hyperbranched polymer as defined above.

Other details and advantages of the invention will emerge more clearly in the light of the examples given below, purely for the purposes of illustration.

EXAMPLES

Example 1 to 6

Synthesis of hyperbranched polyamide (HBPA) based on BTC/AIPA/CL/$C_{16}$ or $C_{18}$ alkyl (Examples 5 and 6)

Example 7

Characterization of the HBPAs of Examples 1 to 4 and 6

Example 8

Preparation of compositions according to the invention based on polyamide PA 6,6, on glass fibres and on alkyl HBPAs according to Examples 1 to 3, at various degrees of incorporation Example 9

Preparation of composition according to the invention without glass fibre based on PA 6,6, HBPA of Examples 1 and 2 according to two degrees of incorporation Example 10

Preparation of compositions according to the invention based on PA 6 and HBPA of Example 6

Example 11

Preparation of compositions according to the invention based on high-mass PA 6 and HBPA of Example 6

Example 12

Preparation of compositions according to the invention based on polypropylene and HBPA of Example 6

Example 13

Preparation of compositions according to the invention based on PA 6,6 and on functionalized hyperbranched products Boltorn® (Perstorp)

Example 14

Evaluation of the rheological and mechanical characteristics of the compositions of Example 8 and 9

Example 15

Evaluation of the flow index of the compositions of Examples 10 and 11

Example 16

Evaluation of the flow index of the compositions of Examples 12

Example 17

Evaluation of the flow index of the compositions of Example 13

Example 18

Measurement of the values of the reductions in pack pressure (die head) during the spinning of the M/functionalized HBPA compositions of Examples 2 and 4

Example 19

Measurement of the reductions in pack pressure (die head) during the spinning of compositions based on high-mass PA 6 and HBPA of Example 6

DESCRIPTION OF THE FIGURES

The attached

Figure 1:
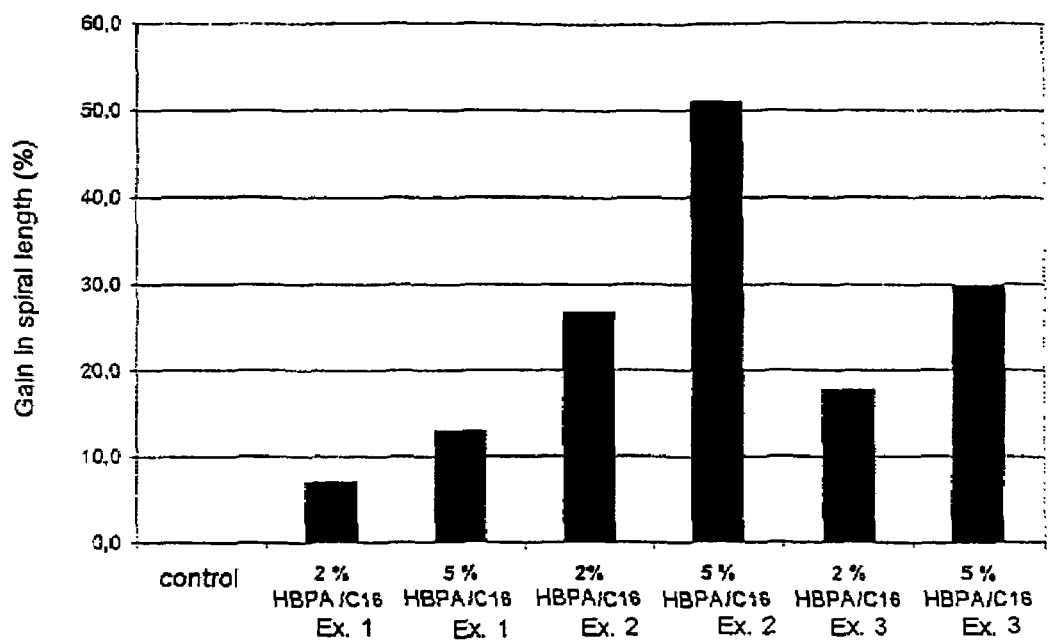
FIG. 1 is a histogram of the variation in the gain of spiral length for the compositions PA 6,6+50% glass fibre+HBPA/$C_{16}$ of Table II.
Figure 2:
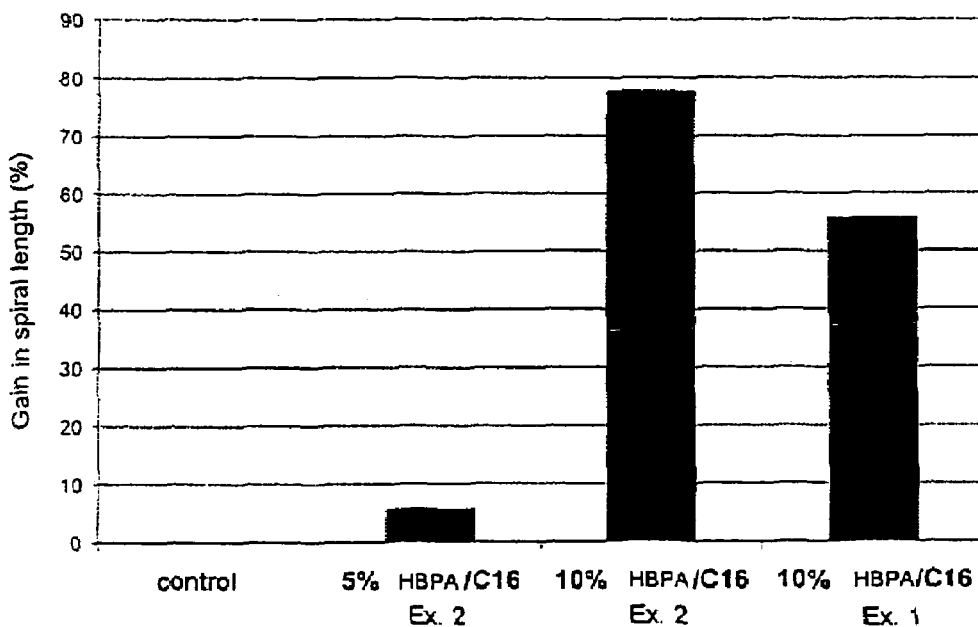
FIG. 2 is a histogram of the gains in spiral length for the compositions PA 6,6+HBPA/$C_{16}$ of Table III.
Figure 3:
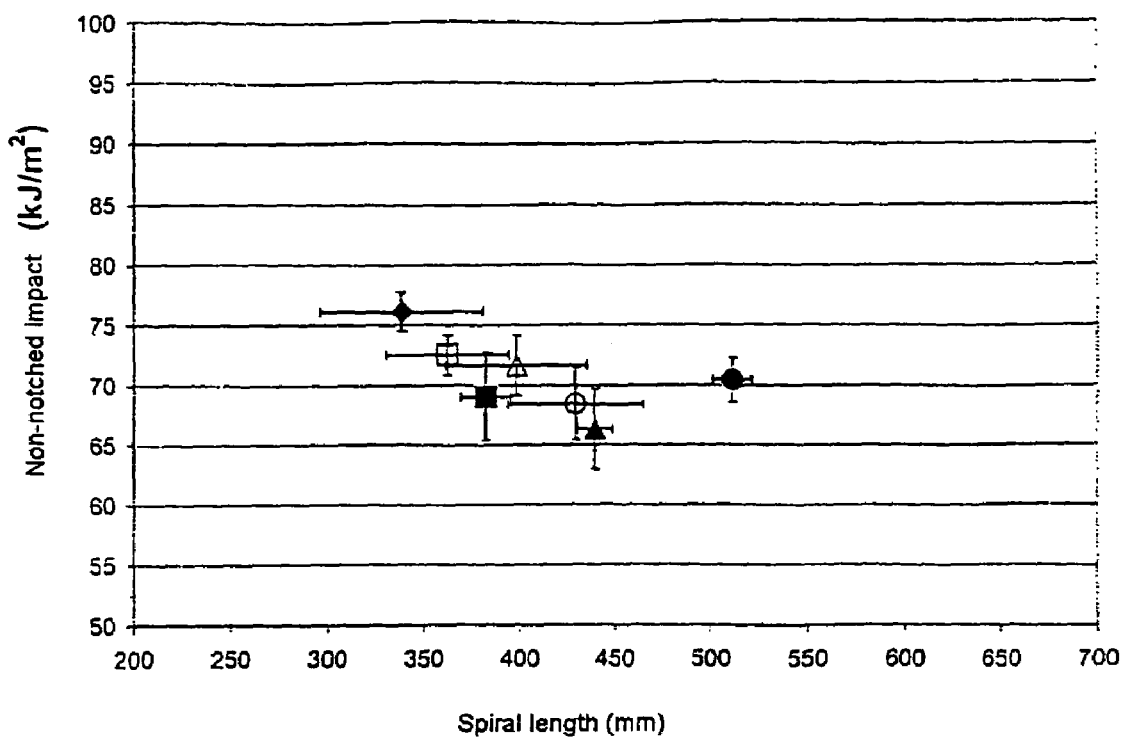
FIG. 3 takes into account the flow index/impact strength compromise by giving the impact strength as a function of the spiral length for the compositions of Table II. The key to FIG. 3 is as follows.

◆: Control PA 6,6+50% GF;
☐: PA 6,6+50% GF+2% HBPA/$C_{16}$ Ex. 1;
■: PA 6,6+50% GF+5% HBPA/$C_{16}$ Ex. 1;
○: PA 6,6+50% GF+2% HBPA/$C_{16}$ Ex. 2;
●: PA 6,6+50% GF+5% HBPA/$C_{16}$ Ex. 2;
Δ: PA 6,6+50% GF+2% HBPA/$C_{16}$ Ex. 3;
▲: PA 6,6+50% GF+5% HBPA/$C_{16}$ Ex. 3;

Example 1

Synthesis of a hyperbranched copolyamide containing hexadecylamide end groups by melt-copolycondensation of 1,3,5-benzenetricarboxylic acid (written BTC, core molecule of $R^1$-$B_3$ type, with B=COOH) of 5-aminoisophthalic acid (written AIPA, branching molecule of A-R-$B_2$ type, with A=$NH_2$), of ε-caprolactam (written CL, spacer of A-R'-B type) and of n-hexadecylamine (written $C_{16}$, alkyl blocker of $R^2$-A type). The respective overall composition is 1/25/25/28 of BTC/AIPA/CL/$C_{16}$, (III/I+II+IV=1/78)

The reaction is performed at atmospheric pressure in a 7.5 l autoclave commonly used for the molten-phase synthesis of polyesters or polyamides.

The monomers are completely loaded at the start of the test into the reactor preheated to 70° C. and with stirring at 80 rpm. 1685.0 g of molten 90% pure hexadecylamine (6.28 mol), 634.6 g of ε-caprolactam (5.61 mol), 1015.8 g of 5-aminoisophthalic acid (5.61 mol), 47.1 g of 1,3,5-benzenetricarboxylic acid (0.22 mol) and 6.0 g of aqueous 50% (w/w) hypophosphorous acid are successively introduced into the reactor. The reactor is purged by a succession of 4 sequences of placing under vacuum and re-establishing the atmospheric pressure with dry nitrogen.

The reaction mass is gradually heated from 70 to 260° C. with stirring, over about 200 minutes.

After stirring for 30 minutes at 260° C., the reactor is gradually placed under vacuum over 60 minutes. The minimum vacuum is then maintained for a further 30 minutes. 229.5 g of distillate are recovered.

At the end of the cycle, the stirring is stopped and the reactor is placed under an excess pressure of nitrogen. Next, the base valve is gradually opened and the polymer is run out at 260° C. into a stainless-steel bucket. The product is then cooled in cardice under a stream of nitrogen. 2900 g of polymer are collected.

The hyperbranched copolyamide obtained is vitreous and may be readily crushed into flakes or ground.

Example 2

Synthesis of a hyperbranched copolyamide containing hexadecylamide end groups by melt-copolycondensation of 1,3,5-benzenetricarboxylic acid (written BTC, core molecule of $R^1$-$B_3$ type, with B=COOH) of 5-aminoisophthalic acid (written AIPA, branching molecule of A-R-$B_2$ type, with A=$NH_2$), of ε-caprolactam (written CL, spacer of A-R'-B type) and of n-hexadecylamine (written $C_{16}$, alkyl blocker of $R^2$-A type). The respective overall composition is 1/6/6/9 of BTC/AIPA/CL/$C_{16}$, (III/I+II+IV=1/21)

The assembly and procedure used are identical in all respects to those described in Example 1.

1867.4 g of molten 90% pure hexadecylamine (6.96 mol), 525.1 g of ε-caprolactam (4.64 mol), 840.6 g of 5-aminoisophthalic acid (4.64 mol), 162.5 g of 1,3,5-benzenetricarboxylic acid (0.77 mol), and 6.1 g of aqueous 50% (w/w/) hypophosphorous acid solution are successively loaded into the reactor preheated to 70° C.

The reaction mass is gradually heated from 70 to 260° C. with stirring, over about 200 minutes.

After stirring for 30 minutes at 260° C., the reactor is placed under vacuum to complete the polycondensation. 155.2 g of distillate are collected.

At the end of the cycle, the polymer is discharged via the base valve at 260° C. into a stainless-steel beaker and then cooled in cardice under a stream of nitrogen. 2946 g of polymer are collected.

The hyperbranched copolyamide obtained is vitreous.

Example 3

Synthesis of a hyperbranched copolyamide containing hexadecylamide end groups by melt-copolycondensation of 1,3,5-benzenetricarboxylic acid (written BTC, core molecule of $R^1$-$B_3$ type, with B=COOH) of 5-aminoisophthalic acid (written AIPA, branching molecule of A-R-$B_2$ type, with A=$NH_2$), of ε-caprolactam (written CL, spacer of A-R'-B type) and of n-hexadecylamine (written $C_{16}$, alkyl blocker of $R^2$-A type). The respective overall composition is 1/20/40/23 of BTC/AIPA/CL/$C_{16}$, (III/I+II+IV=1/83)

The assembly and the procedure used are identical in all respects to those described in Example 1.

1408.9 g of molten 90% pure hexadecylamine (5.25 mol), 1033.5 g of ε-caprolactam (9.13 mol), 827.2 g of 5-aminoisophthalic acid (4.57 mol), 48.0 g of 1,3,5-benzenetricarboxylic acid (0.23 mol) and 6.5 g of aqueous 50% (w/w) hypophosphorous acid solution are successively loaded into the reactor preheated to 70° C.

The reactor is stirred and heated as in Example 1. 193.4 g of distillate are collected.

At the end of the cycle, the polymer is run into a stainless-steel beaker and then cooled in cardice under a stream of nitrogen. 2837.5 g of polymer are collected.

The hyperbranched copolyamide obtained is vitreous.

Example 4

Synthesis of a hyperbranched copolyamide containing hexadecylamide end groups by melt-copolycondensation of 1,3,5-benzenetricarboxylic acid (written BTC, core molecule of $R^1$-$B_3$ type, with B=COOH) of 5-aminoisophthalic acid (written AIPA, branching molecule of A-R-$B_2$ type, with A=$NH_2$), of ε-caprolactam (written CL, spacer of A-R'-B type) and of n-hexadecylamine (written $C_{16}$, alkyl blocker of $R^2$-A type). The respective overall composition is 1/5/10/8 of BTC/AIPA/CL/$C_{16}$, (III/I+II+IV=1/23)

The reaction is carried out at atmospheric pressure in a 1.0 l autoclave commonly used in the laboratory for the molten-phase synthesis of polyesters or polyamides.

The monomers are completely loaded at the start of the test into the reactor at 20° C. 190.4 g of solid 90% pure hexadecylamine (0.71 mol), 100.4 g of ε-caprolactam (0.89 mol), 80.4 g of 5-aminoisophthalic acid (0.44 mol), 18.6 g of 1,3,5-benzenetricarboxylic acid (0.09 mol) and 0.76 g of aqueous 50% (w/w) hypophosphorous acid solution are successively loaded into the reactor.

The reaction mass is gradually heated from 20 to 260° C. with stirring, over about 200 minutes.

After stirring for 63 minutes at 260° C., the reactor is gradually placed under vacuum over 61 minutes. The minimum vacuum achieved is 1 to 2 mbar and is then maintained for a further 30 minutes. About 8 ml of distillate are collected.

At the end of the cycle, the stirring is stopped and the reactor is placed under an excess pressure of nitrogen. The base valve is gradually opened and the polymer is run out into a stainless-steel beaker. The product is then cooled in cardice under a stream of nitrogen. 339 g of polymer are collected, including the samples taken during synthesis.

The hyperbranched copolyamide obtained is vitreous.

Example 5

Synthesis of a hyperbranched copolyamide containing octadecylamide end groups by melt-copolycondensation of 1,3,5-benzenetricarboxylic acid (written BTC, core molecule of $R^1$-$B_3$ type, with B=COOH) of 5-aminoisophthalic acid (written AIPA, branching molecule of A-R-$B_2$ type, with A=$NH_2$), of ε-caprolactam (written CL, spacer of A-R'-B type) and of n-octadecylamine (written $C_{18}$, alkyl blocker of $R^2$-A type). The respective overall composition is 1/6/6/9 of BTC/AIPA/CL/$C_{18}$, (III/I+II+IV=1/21)

The reaction is performed at atmospheric pressure in a 0.5 l glass autoclave commonly used in the laboratory for the molten-phase synthesis of polyesters or polyamides.

122.0 g of 90% pure octadecylamine pellets (0.41 mol), 30.9 g of ε-caprolactam (0.27 mol), 49.4 g of 5-aminoisophthalic acid (0.27 mol), 9.6 g of 1,3,5-benzenetricarboxylic acid (0.05 mol) and 0.25 g of aqueous 50% (w/w) hypophosphorous acid solution are successively loaded into the reactor at 90° C.

The reaction mass is gradually heated from 90 to 260° C. with stirring, over about 200 minutes.

The temperature is maintained at 260° C. with stirring for 60 minutes. The reactor is then gradually placed under vacuum over 38 minutes. The minimum vacuum reached is 5 mbar and is then maintained for a further 65 minutes. 12.5 g of distillate are collected.

At the end of the cycle, the polymer is cooled in the reactor under a stream of nitrogen. 157.9 g of polymer are collected (without taking into account the samples removed during synthesis). The hyperbranched copolyamide is vitreous and may be readily crushed into flakes or ground.

Example 6

Synthesis of a hyperbranched copolyamide containing hexadecylamide end groups by melt-copolycondensation of 1,3,5-benzenetricarboxylic acid (written ARC, core molecule of $R^1$-$B_3$ type, with B=COOH) of 5-aminoisophthalic acid (written AIPA, branching molecule of A-R-$B_2$ type, with A=$NH_2$), of ε-caprolactam (written CL, spacer of A-R'-B type) and of n-octadecylamine (written $C_{18}$, alkyl blocker of $R^2$-A type). The respective overall composition is 1/6/6/9 of BTC/AIPA/CL/$C_{18}$, (III/I+II+IV=1/21)

The reaction is performed at atmospheric pressure in a 200 l autoclave commonly used for the molten-phase synthesis of polyesters or polyamides.

The monomers are completely loaded at the start of the test into the reactor preheated to 70° C. and with stirring at 80 rpm. 47 kg of molten octadecylamine (0.17 mol), 14.0 kg ε-caprolactam (0.12 mol), 22.4 kg of 5-aminoisophthalic acid (0.12 mol), 4.3 kg of 1,3,5-benzenetricarboxylic acid (0.02 mol) and 163 g of an aqueous 50% (w/w) hypophosphorous acid solution are successively introduced into the reactor. The reactor is purged by a succession of 4 sequences of placing under vacuum and re-establishing atmospheric pressure with dry nitrogen.

The reaction mass is gradually heated from 20 to 260° C. with stirring, over about 200 minutes.

The reaction mass is gradually heated from 70 to 260° C. with stirring, over about 200 minutes.

After stirring for 30 minutes at 260° C., the reactor is gradually placed under vacuum over 60 minutes. The minimum vacuum is then maintained for a further 30 minutes. About 6 kg of distillate are collected.

At the end of the cycle, a Sandvik palletting machine is connected to the reactor outlet and the polymer is run out using a gear-type pump in rotary form. The pellets thus formed are then cooled on a metal belt cooled underneath with water. The polymer is bagged directly at the end of the belt. About 70 kg of polymer are collected per synthesis.

The hyperbranched copolyamide obtained is vitreous.

Example 7

Characterization of hyperbranched polyamides containing alkyl end groups with different A-R-$B_2$/A-R'-B ratios and different molar masses Various hyperbranched polymers are synthesized according to the protocols described in Examples 1 to 4 and 6. In all cases, the monomer A-R'-B is ε-caprolactam and the monomer A-R-$B_2$ is 5-aminoisophthalic acid.

The contents of acid and amine end groups are assayed by potentiometry. The molar masses are determined by gel permeation chromatography (GPC) in dimethylacetamide, relative to polystyrene standards, and then by RI refractometry.

The results are collated in Table I below.

The rheological and mechanical properties of these compositions are evaluated in Example 14.

Example 9

Preparation of blends of PA 6,6 matrix+$C_{16}$ alkyl HBPA

The PA 6,6 used is the same as in Example 8 and the $C_{16}$ alkylated HBPBs are those of Examples 2 and 1, at weight contents of 5% and 10% (only 10% for Example 1) relative to the total weight of the blend.

The rheological and mechanical evaluations are given in Example 14 below.

Example 10

Preparation of a composition according to the invention based on PA6 and HBPA from Example 6

The HBPA from Example 6 is first preblended in the desired proportions with PA 6 granules.

The PA 6 under consideration has a relative viscosity, measured at 25° C. at a concentration of 0.01 g/mg in 96%

TABLE 1

| No. | Composition BTC/AIPA/CL/$C_{16}$ or $C_{18}$ | Ratio $ARB_2$/AR'B | Theoretical Mn (g/mol) | AEG (meq/Kg) | CEG (meq/Kg) | Mn (g/mol) | Mw (g/mol) | Mz (g/mol) | IP |
|---|---|---|---|---|---|---|---|---|---|
| 1 | 1/25/25/28 ($C_{16}$) | 1/1 | 13375 | 2.4 ± 0.6 | 20.4 ± 1.6 | 6020 | 11240 | 17830 | 1.87 |
| 2 | 1/6/6/9 ($C_{16}$) | 1/1 | 3879 | 3.1 ± 0.3 | 7.7 ± 1.8 | 4890 | 7750 | 11440 | 1.58 |
| 3 | 1/20/40/23 ($C_{16}$) | 1/2 | 13139 | 3.7 ± 0.4 | 35.7 ± 1.2 | 6780 | 13250 | 21600 | 1.95 |
| 4 | 1/5/10/8 ($C_{16}$) | 1/2 | 3945 | 14.0 ± 0.5 | 15.5 ± 0.7 | 4860 | 7630 | 11280 | 1.57 |
| 6 | 1/6/6/0 ($C_{18}$) | 1/1 | 4005 | 3.9 | 12.9 | 6600 | 11710 | — | 1.8 |

Abbreviations:
BTC: Bensenetricarboxylic acid or trimesic acid
AIPA: 5-aminoisophthalic acid
CL: ε-caprolactam
$C_{16}$: n-Hexadecylamine
$C_{18}$: n-Octadecylamine
AEG: Content of amine end groups
CEG: Content of acid end groups
Mn, Mw, Mz: Mean molar masses in polystyrene equivalents
IP: Polydispersity index The DSC analyses of these hyperbranched polyamides show only one broad melting peak at about −4° C. This peak corresponds to the alkyl segments and underlines the phase microsegregation of the hydrophobic units relative to the polyamide units.

Example 8

Preparation of mixtures of PA 6,6 polyamide matrix/Glass fibre/$C_{16}$ alkyl HBPA additive for modifying the rheological behaviour The HBPAs of Examples 1, 2 and 3 are coarsely ground and preblended in the desired proportions with PA 6,6 granules.

The PA 6,6 is defined as follows: viscosity index measured at 25° C. in 90% formic acid (ISO 307) of 137, amine end group content of 53 meq/kg and acid end group content of 72 meq/kg.

Compositions containing 50% by weight of glass fibre (Owens Corning OCF180K) and a PA 6,6 matrix supplemented with variable amounts of the HBPAs of Examples 1, 2 and 3 are made by melt-blending at a temperature of 280° C. in a twin-screw extruder.

A control consisting of a thermoplastic composition based on PA 6,6 and 50% by weight of glass fibre is also prepared.

sulphuric acid solution, of 2.7. Its amine end group content is 35 meq/kg and its acid end group content is 57 meq/kg.

The compositions of PA 6 supplemented with variable amounts of HBPA from Example 6 are produced by melt-blending at a temperature of 250° C. in a twin-screw extruder. A control PA 6 without HBPA is also prepared.

The rheological properties of these compositions are evaluated in Example 15.

Example 11

Preparation of a composition according to the invention based on High-mass PA 6 and HBPA from Example 6

The HBPA from Example 6 is first preblended in the desired proportions with high-mass PA 6 granules.

The high-mass PA 6 is defined by its relative viscosity, measured at 25° C. at a concentration of 0.01 g/ml in 96% sulphuric acid solution, which is greater than 3.5 and preferably greater than 3.8. Its amine end group content is 33 meq/kg and its acid end group content is 31 meq/kg.

The compositions of high-mass PA 6 supplemented with variable amounts of HBPA from Example 6 are produced by melt-blending at a temperature of 300° C. in a twin-screw extruder. A high-mass PA 6 control without HBPA is also prepared.

The rheological properties of these compositions are evaluated in Example 15.

Example 12

Preparation of a composition according to the invention based on polypropylene and HBPA from Example 6

The HPBA from Example 6 is first preblended in the desired proportions with PP granules. The PP used is an Appryl® grade from Atofina, with a Melt Flow Index, measured at 230° C. under 2.16 kg, of 3 g/10 minutes (ISO 1133). The compositions of PP supplemented with variable amounts of HBPA from Example 6 are prepared by melt-blending at a temperature of 180° C. in a twin-screw extruder. A control PP without HBPA is also prepared.

The rheological properties of these compositions are evaluated in Example 16.

Example 13

Preparation of compositions based on PA 6,6 and functionalized boltorn® (Perstorp) hyperbranched products The incorporation of the hyperbranched products (at 5% by weight relative to the total weight of the composition) into PA 6,6 is performed by blending coarse powders, and then melt-blending using a microextruder, at a temperature of 285° C.

The PA 6,6 under consideration has a viscosity index, measured at 25° C. in 90% formic acid (ISO 307) of 135 ml/g.

The Boltorn® hyperbranched products (polyester based) under consideration are the following:
Boltorn® H30 functionalized with 95% benzoic acid
Boltorn® H40 functionalized with 95% dodecanoic acid.

The rheological properties of these compositions are evaluated in Example 17.

Example 14

Rheological and mechanical evaluation of the compositions of Examples 8 and 9

The tests performed are:
Spiral test ST (melt flow index) for quantification of the flow index of the compositions according to the invention and of the control compositions:

The granules of composition M/hyperbranched polymer or of control composition M are melted and then injected into a spiral-shaped mould with a semicircular cross section 2 mm thick and 4 mm in diameter, in a Demag H200-80 press at a plasticizing cylinder temperature of 300° C., a mould temperature of 80° C. and with an injection pressure of 1500 bar. The injection time is 0.5 second. The result is expressed as the length of mould correctly filled with the composition. The compositions evaluated in this test all have an equivalent moisture content before moulding to within 0.1% relative to the matrix.

Mechanical tests

The mechanical characteristics are evaluated by non-notched impact tests (ISO 179/1eU), notched impact tests (ISO 179/1eA), flexural modulus ISO 178, flexural breaking stress ISO 178 and tests of temperature of bending under load (HDT) ISO 75Ae. The results are given in Tables II and III below.

TABLE II

Compositions with a 50% content of glass fibres (GF)

| Composition | Spiral length (mm) | Moisture content before moulding (%) * | Mass of PA (g/mol) ** | % of change in mass relative to the mass of the control | Non-notched impact (KJ/m$^2$) ISO 179/1Eu | Notched impact (KJ/m$^2$) ISO 179/1eA | Flexural modulus (N/mm$^2$) ISO 178 | Flexural breaking stress (N/mm$^2$) ISO 178 | HDT (° C.) (1.80 N/mm$^2$) ISO 75Ae |
|---|---|---|---|---|---|---|---|---|---|
| Control PA66/50% GF | 339 | 0.20 | 65250 | | 82.4 | 11.0 | 11800 | 280 | 248 |
| PA66/50% GF + 2% HBPA/C$_{16}$ Ex. 1 | 363 | 0.18 | 62440 | −4.3 | 76.2 | 10.5 | 11500 | 268 | 245 |
| PA66/50% GF + 5% HBPA/C$_{16}$ Ex. 1 | 383 | 0.18 | 69830 | +7.0 | 71.6 | 10.4 | 12100 | 270 | 248 |
| PA66/50% GF + 2% HBPA/C$_{16}$ Ex. 2 | 430 | 0.26 | 63550 | −2.6 | 76.3 | 10.3 | 11500 | 262 | 245 |
| PA66/50% GF + 5% HBPA/C$_{16}$ Ex. 2 | 512 | 0.20 | 63420 | −2.8 | 75.9 | 10.0 | 10900 | 256 | 245 |
| PA66/50% GF + 2% HBPA/C$_{16}$ Ex. 3 | 399 | 0.24 | 62530 | −4.2 | 74.5 | 10.2 | 11500 | 261 | 245 |
| PA66/50% GF + 5% HBPA/C$_{16}$ Ex. 3 | 440 | 0.18 | 64970 | −0.4 | 67.9 | 10.1 | 11700 | 262 | 245 |

* Moisture content relative to the matrix measured by the Karl-Fischer method
** Maximum of the molecular mass distribution of the polyamide matrix supplemented with functionalized HBPA, as polystyrene equivalents, measured by Gel Permeation Chromatography (GPC) with refractometric detection after carrying the spiral test for quantification of the flow index.

TABLE III (Example 9) Compositions without glass fibre

| Composition | Spiral length (mm) |
|---|---|
| PA66 | 556 |
| PA66 + 5% HBPA/$C_{16}$ Ex. 2 | 588 |
| PA66 + 10% HBPA/$C_{16}$ Ex. 2 | 988 |
| PA66 + 10% HBPA/$C_{16}$ Ex. 2 | 866 |

Example 15

Evaluation of the Flow Index of the Compositions of Examples 10 and 11

The results are given in Table IV below.

TABLE IV

| Composition | Spiral length (mm) | Mass of the PA by GPC (g/mol) * |
|---|---|---|
| Control PA 6 | 425 | 71560 |
| PA 6 + 5% HBPA Example 6 | 621 | 71400 |
| PA 6 + 10% HBPA Example 6 | 1033 | 70200 |
| Control high-mass PA 6 | 355 | 82150 |
| High-mass PA 6 + 5% HBPA Example 6 | 617 | 87740 |

* Maximum of the molecular mass distribution of the polyamide matrix supplemented with functionalized HBPA, as polystyrene equivalents, measured by Gel Permeation Chromatography (GPC) with refractometric detection after carrying the spiral test for quantification of the flow index.

Example 16

Evaluation of the Flow Index of the Compositions of Example 12

The results are given in Table V below

TABLE V

| Composition | Spiral Length (mm) |
|---|---|
| Control PP | 439 |
| PP + 5% HBPA Example 6 | 516 |
| PP + 10% HBPA Example 6 | 715 |

Example 17

Evaluation of the Flow Index of the Compositions of Example 13

A measurement of the force exerted on the screw axle by the molten material makes it possible to assess the flow index of the composition.

The relative reductions in force compared with the control PA 6,6 without hyperbranched product and also the values of the mass of PA 6,6 measured by GPC are collated in Table VI below. A comparative example with a composition PA 6,6+ HBPA $C_{16}$ (1/25/25/28) is also mentioned in this table.

TABLE VI

| Composition | Variation in the force/control | Mass of PA by GPC (g/mol) * |
|---|---|---|
| Control PA 6, 6 | 0 | 74000 |
| PA 6, 6 + 5% HBPA 1/25/25/28 $C_{16}$ Example 1 | −25% | 74000 |
| PA 6, 6 + 5% Boltorn ® H30 functionalized with benzoic acid | −47% | 69000 |
| PA 6, 6 + 5% Boltorn ® H40 functionalized with dodecanoic acid | −37% | 68800 |

* Maximum of the molecular mass distribution of the polyamide matrix supplemented with hyperbranched product, as polystyrene equivalents, measured by Gel Permeation Chromatography (GPC) with refractometric detection after passing through a microextruder.

Example 18

Measurement of the Values of the Reductions in Pack Pressure (Die Head) During the Spinning of the M/Functionalized HBPA Compositions of Examples 2 and 4

The polyamide 66 used is a polyamide 66 comprising no titanium dioxide, with a relative viscosity of 2.5 (measured at a concentration of 10 g/l in 96% sulphuric acid).

The incorporation of the HBPA (2% or 5% by weight relative to the total weight of the composition) into the PA 66 is performed by blending powders and then melt-blending using a twin-screw extrusion device. The molten blend is then spun with a speed at the first point of call of 800 m/minutes, so as to obtain a continuous multifilament yarn of 90 dtex per 10 filaments.

The temperature-pressure and spinning course and the properties of the yarn obtained are detailed below:
Spinning course: no breaking
Twin-screw extruder heating: 285° C.
Spin speed of the screws: 120 rpm
Die head heating: 287° C.
Flow rate under die: 0.41 kg/h.

The multifilament or yarn consists of 10 strands (the die consists of 10 holes) and the diameter of a strand is about 30 μm.

The values of the reductions in pack pressure (die head) are measured using a Dynisco probe pressure (0-350 bar).

The results obtained are given in Table VII below.

TABLE VII

| Composition | Pack pressure (bar) | Delta pressure/control | Mass of PA by GPC with detection by refractometer * |
|---|---|---|---|
| Control PA 66 | 35.4 | | 66 000 |
| PA 66 + 5% 1/5/10/8 Example 4 | 25.5 | −28.0% | 67 000 |
| PA 66 + 5% 1/6/6/9 Example 2 | 28.0 | −20.9% | 66 000 |
| PA 66 + 2% 1/5/10/8 Example 4 | 33.0 | −6.8% | 66 000 |
| PA 66 + 2% 1/6/6/9 Example 2 | 34.5 | −2.5% | 66 000 |

* Maximum of the molecular mass distribution of the polyamide matrix supplemented with functionalized HBPA, in polystyrene equivalents, measured by GPC with refractometric detection after spinning.

Example 19

Measurement of the Reductions in Pack Pressure (Die Head) During the Spinning of Compositions Based on High-mass PA 6 and HBPA of Example 6

The high-mass polyamide 6 used is the same as that described in Example 11.

The introduction of the HBPA (2% or 5% by weight relative to the total weight of the composition) into the high-mass PA 6 is performed by blending powders and then melt-blending using a twin-screw extrusion device. The molten blend is then spun with a speed at the first point of call of 800 m/minute, so as to obtain a continuous multifilament yarn of 220 dtex per 10 filaments. The temperature, pressure and spinning course and the properties of the yarns obtained are detailed below:

Spinning course: no breaking
Twin-screw extruder heating: 325° C.
Screw spin speed: 220 rpm
Die head heating: 296° C.

The values of the reductions in pack pressure (die head) are measured using a Dynisco probe pressure (0-350 bar).

The results obtained are given in Table VIII below.

TABLE VIII

| Composition | Pack pressure (bar) | Delta pressure/control | Mass of PA by GPC (g/mol) * |
|---|---|---|---|
| Control PA 6 | 118 | 0 | 82360 |
| High mass PA 6 + 2% HBPA Example 11 | 100 | −15% | 81720 |
| High mass PA 6 + 5% HBPA Example 11 | 70 | −41% | 86280 |

Maximum of the molecular mass distribution of the polyamide matrix supplemented with functionalized HBPA, in polystyrene equivalents, measured by GPC with refractometric detection after spinning.

Example 20

Comparison of the Molar Mass of the Matrices of Compositions According to the Invention (PA 66/$C_{16}$ alkyl HBPA/Glass Fibre) of the Type of those of Example 8 and of Compositions Comprising Polyamide 66, an Additive of the Unfunctionalized HPBA Type and Glass Fibre.

20.1—Preparation of the Unfunctionalized HBPA:

Synthesis of a hyperbranched copolyamide containing carboxylic acid end groups by melt-copolycondensation of 1,3,5-benzenetricarboxylic acid (core molecule of $R^1$-$B''_3$ type, with $B''$=COOH); of 5-aminoisophthalic acid (branching molecule of A-R-$B_2$ type, with A=$NH_2$ and B=COOH) and of ε-caprolactam (spacer of A'-R'-B' type with A'=$NH_2$ and B'=COOH).

The reaction is performed at atmospheric pressure in a 7.5 l autoclave commonly used for the molten-phase synthesis of polyesters or polyamides.

The monomers are completely loaded at the start of the test. 1811.5 g of 5-aminoisophthalic acid (10 mol), 84 g of 1,3,5-benzenetricarboxylic acid (0.4 mol), 1131.6 g of ε-caprolactam (10 mol), and 1.35 g of an aqueous 50% (w/w) hypophosphorous acid solution are successively introduced into the reactor. The reactor is purged by a succession of 4 sequences of placing under vacuum and of re-establishing atmospheric pressure with dry nitrogen.

The reaction mass is gradually heated from 20 to 200° C. over 100 minutes, and then from 200 to 245° C. over 60 minutes. When the bulk temperature reaches 100° C., stirring is started at a spin speed of 50 rpm. The distillation begins at a bulk temperature of 160° C. and continues up to a temperature of 243° C. At 245° C., the stirring is stopped and the reactor is placed under an excess pressure of nitrogen. Next, the base valve is gradually opened and the polymer is run out into a stainless-steel bucket filled with water.

The water contained in the 221.06 g of collected distillate is titrated using a Karl Fischer coulometer. The water content of the distillate is 81.1%, which reflects an overall degree of progress of 99.3%.

The hyperbranched copolyamide obtained is soluble at room temperature in the amount of aqueous sodium hydroxide required to neutralize the terminal acid functions.

20.2—Preparation of the Compositions PA 66+Functionalized HBPA According to 20.1+Glass Fibre and of a Control Composition Free of Unfunctionalized HBPA The process is performed as indicated in Example 8, with the exception of the extrusion temperature, which in this case is 250° C.

20.3—Measurement of the Molar Mass of the Matrix of the Compositions According to 20.2 and of the Compositions Obtained in Example 8, According to Protocol P The compositions and the results are given in Table IX below.

TABLE IX (Example 20) Comparison between unfunctionalized HBPA (COOH end group) and functionalized HBPA (alkyl end group) on granules of blend with PA (obtained from extrusion)

| Composition of the granules | Mass of PA (g/mol) according to protocol P | % variation in mass relative to the control |
|---|---|---|
| Control PA 66/50% GF | 73770 | / |
| PA 66/50% GF + 2% HBPA/$C_{16}$ Ex. 1 | 73690 | −0.1 |
| PA 66/50% GF + 5% HBPA/$C_{16}$ Ex. 1 | 74320 | +0.7 |
| PA 66/50% GF + 2% HBPA/$C_{16}$ Ex. 2 | 75020 | +1.7 |
| PA 66/50% GF + 5% HBPA/$C_{16}$ Ex. 2 | 75650 | +2.4 |
| PA 66/50% GF + 2% HBPA/$C_{16}$ Ex. 3 | 74780 | +1.4 |
| PA 66/50% GF + 5% HBPA/$C_{16}$ Ex. 3 | 75330 | +2.1 |
| Control PA 6/50% GF according to 20.2 | 75000 | / |
| PA 6/50% GF + 2% HBPA/COOH according to 20.2 | 70000 | −6.6 |
| PA 6/50% GF + 5% HBPA/COOH according to 20.2 | 60000 | −20 |
| PA 6/50% GF + 10% HBPA/COOH according to 20.2 | 57000 | −24 |

The invention claimed is:

1. A thermoplastic polymer composition, comprising:
   (1) a matrix M based on at least one thermoplastic polymer or copolymer, and
   (2) at least one hyperbranched polymer additive for modifying the rheological behaviour of said composition, comprising at least one polymer or copolymer:
      (a) which is functionalized,
      (b) which is hyperbranched, and
      (c) at least 50% of the end groups of said hyperbranched polymer or copolymer being functionalized with $R^2$,
   wherein $R^2$ is a substituted or unsubstituted hydrocarbon-based radical selected from the group consisting of a silicone radical, a linear or branched alkyl radical, an aromatic radical, an alkylaryl radical, an arylalkyl radical and a cycloaliphatic radical, said alkyl or cycloalkyl radical or the alkyl portion of said alkylaryl or arylalkyl radicals optionally having one or more unsaturations and/or one or more hetero atoms, and $R^2$ is not reactive with the matrix.

2. A composition according to claim 1, wherein the hyperbranched polymer is a polyester, a polyesteramide or a polyamide.

3. A composition according to claim 1, wherein the hyperbranched polymer additive is a hyperbranched polyamide comprising at least one hyperbranched copolyamide obtained by reaction between:
   (1) at least one monomer of formula (I):

-A-R-B$_f$ in which A is a first polymerization-reactive function, B is a second polymerization-reactive function that is capable of reacting with A, R is a hydrocarbon-based species optionally comprising hetero atoms, and f is the total number of reactive functions B per monomer with $f \geq 2$;

optionally at least one difunctional spacer monomer of formula (II):

-A'-R'-B' or the corresponding lactams, wherein A', B' and R' have the same meaning as that given above for A, B and R, respectively, in formula (I);

optionally at least one "core" monomer of formula (III):

-R$^1$(B")$_n$ wherein:
   $R^1$ is a substituted or unsubstituted hydrocarbon-based radical selected from the group consisting of a silicone radical, a linear or branched alkyl radical, an aromatic radical, an arylalkyl radical, an alkylaryl radical and a cycloaliphatic radical, said alkyl or cycloalkyl radical or the alkyl portion of said alkylaryl or arylalkyl radicals optionally having one or more unsaturations and/or one or more hetero atoms;
   B" is a reactive function of the same nature as B or B'; and $n \geq 1$; and
   (2) at least one "chain-limiting" functionalization monomer corresponding to formula (IV):

-R$^2$-A"

wherein:
   A" is a reactive function of the same nature as A or A' and $R^2$ has the same meaning as that previously given in claim 1.

4. A composition according to claim 3, wherein $2 \leq f \leq 10$ and $1 \leq n \leq 100$.

5. A composition according to claim 4, wherein, in the hyperbranched copolyamide constituting the hyperbranched polymer additive, the hydrocarbon-based species R and R' of the monomers (I) and (II), respectively, each comprise:
   i. at least one linear or branched aliphatic radical;
   ii. at least one cycloaliphatic radical;
   iii. at least one aromatic radical comprising one or more aromatic nuclei; or
   iv. at least one aralipatic radical;
   these radicals (i), (ii), (iii) and (iv) possibly being substituted or comprising hetero atoms;
   A or A' is amine, amine salt, acid, ester, acid halide or amide; and
   B or B' is an acid, ester, acid halide, amide, amine or amine salt.

6. A composition according to claim 3, wherein the polymerization-reactive functions A, B, A' and B' of the hyperbranched copolyamide are carboxylic or amine functions.

7. A composition according to claim 3, wherein the hyperbranched copolyamide (HBPA) comprises monomers of formula (III) in a III/I+II+IV molar ratio defined as follows:

III/I+II+IV ≤ 1/150.

8. A composition according to claim 3, wherein the monomer of formula (I) of the hyperbranched copolyamide (HBPA) is a compound in which A represents an amine function, B represents a carboxylic function, R represents an aromatic radical, and f=2.

9. A composition according to claim 3, wherein the monomer of formula (I) is:
   5-amino-isophthalic acid,
   6-amino undecanedioic acid,
   3-aminopimelic diacid,
   aspartic acid,
   3,5-diaminobenzoic acid, or
   3,4-diaminobenzoic acid;
   the difunctional monomer of formula (II) is:
   ε-caprolactam or the corresponding amino acid aminocaproic acid,
   para- or meta-aminobenzoic acid,
   11-amino-undecanoic acid, or
   lauryllactam and/or the corresponding amino acid 12-aminododecanoic acid;
   the "core" monomer of formula (III) is:
   1,3,5-benzenetricarboxylic acid,
   2,2,6,6-tetra(β-carboxyethyl)cyclohexanone,
   2,4,6-tri(aminocaproic acid)-1,3,5-triazine, or
   4-aminoethyl-1,8-octanediamine; and
   the "chain-limiting" functionalization monomer of formula (IV) is:
   n-hexadecylamine,
   n-octadecylamine,
   n-dodecylamine, or
   benzylamine.

10. A composition according to claim 3, wherein the additive comprising at least one hyperbranched copolyamide has a content of acid or amine end groups (EG) (expressed in meq/kg) of between 0 and 25.

11. A composition according to claim 1, wherein said composition is free of hyperbranched polymer additives that result in a reduction of the molar mass of the matrix M of greater than or equal to 7% relative to a control composition comprising said matrix M not supplemented with hyperbranched polymer additives, the molar mass measurement being performed according to a given protocol P.

12. A composition according to claim 11, wherein the molar mass of the composition and the control composition is determined from granular samples of the respective compositions that were extruded, solidified, and then produced in granular form.

13. A composition according to claim 11, wherein mass flow of the composition, according to spiral test ST, is greater relative to said control composition.

14. A composition according to claim 1, wherein the at least one thermoplastic polymer or copolymer constituting the matrix consists of polyolefins, polyesters, polyalkylene oxides, polyoxyalkylenes, polyhalogenoalkylenes, poly(alkylene-phthalates or terephthalates), poly(phenyl or phenylenes), poly(phenylene oxide or sulphide), polyvinyl acetates, polyvinyl alcohols, polyvinyl halides, polyvinylidene halides, polyvinyl nitriles, polyamides, polyimides, polycarbonates, polysiloxanes, acrylic or methacrylic acid polymers, polyacrylates or polymethacrylates, natural polymers, synthetic polymers, thermoplastic copolymers having at least one monomer that is identical to any of the monomers included in the polymers above, blends or alloys of all of these (co)polymers.

15. A composition according to claim 14, wherein the thermoplastic polymer is at least one of nylon 6, nylon 6,6, nylon 4, nylon 11, nylon 12, polyamide 4-6, polyamide 6-10, polyamide 6-12, polyamide 6-36, or polyamide 12-12.

16. A composition according to claim 15, wherein the thermoplastic polymer is at least one nylon 6,6.

17. The composition of claim 14, wherein said natural polymer is cellulose or a cellulose derivative.

18. The composition of claim 14, wherein said synthetic polymer is an elastomer.

19. A composition according to claim 1, wherein the hyperbranched polymer additive comprises a hyperbranched copolymer that is present in a proportion (expressed as % by dry weight relative to the total mass of the composition) of 0.1 to 50.

20. A composition according to claim 1, wherein the radicals $R^2$ are the same throughout the hyperbranched polymer.

21. A composition according to claim 1, further comprising at least one reinforcing filler or bulking filler being fibrous fillers, glass fiber, mineral fillers, fillers made of thermosetting material, powder fillers or talc.

22. Articles obtained by forming a composition as defined in claim 1.

23. Articles according to claim 22, wherein the forming is moulding the composition.

24. Articles according to claim 22, being yarns, fibers, films or filaments.

* * * * *